Figure 1:
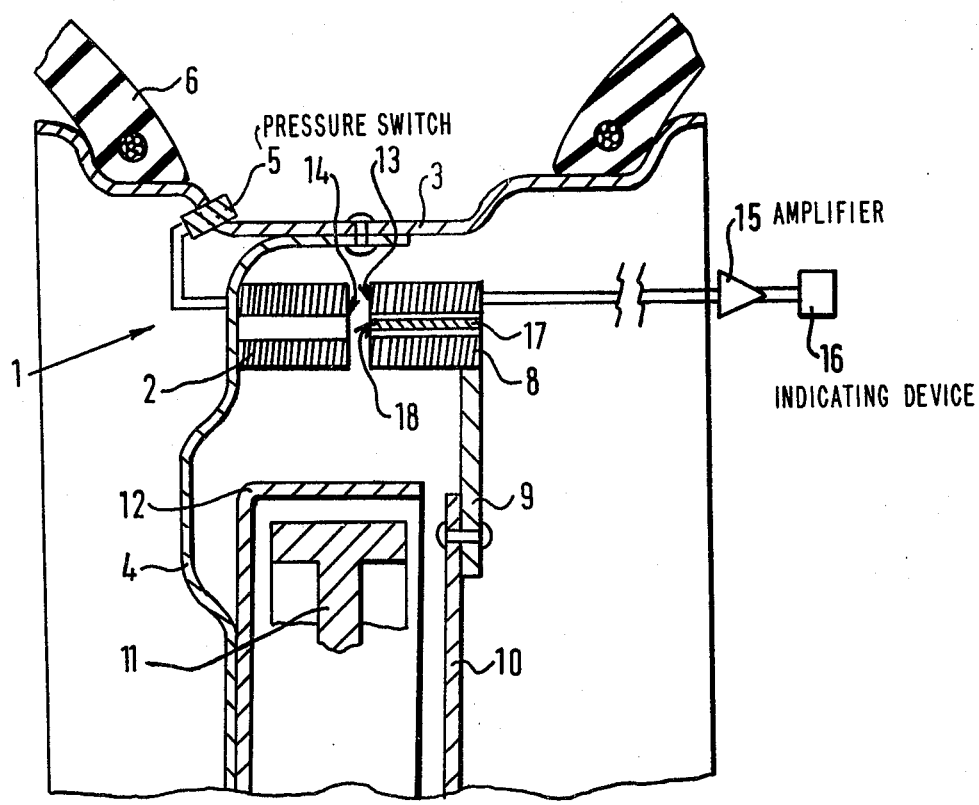

United States Patent

Gould

[11] 3,913,065
[45] Oct. 14, 1975

[54] TIRE DEFLATION DETECTION
[75] Inventor: Eric Gordin Gould, Sutton, England
[73] Assignee: Dunlop Limited, London, England
[22] Filed: June 28, 1973
[21] Appl. No.: 374,665

[30] Foreign Application Priority Data
July 6, 1972 United Kingdom............... 31619/72

[52] U.S. Cl. ............... 340/58; 73/146.5; 200/61.25
[51] Int. Cl.² ........................................ B60C 23/04
[58] Field of Search............ 340/58, 60, 258 C, 259;
200/61.22, 61.25; 180/103; 73/146.3, 146.4,
146.5, 146.8

[56] References Cited
UNITED STATES PATENTS
3,093,812  6/1963  Brown.................................. 340/58
3,374,460  3/1968  Massoubre........................... 340/58

Primary Examiner—John W. Caldwell
Assistant Examiner—Joseph E. Nowicki
Attorney, Agent, or Firm—Stevens, Davis, Miller & Mosher

[57]  ABSTRACT

Apparatus for detecting fall of inflation pressure in a pneumatic tire comprising a first coil mounted on the wheel and closeable by means of a pressure responsive switch, and a second coil non-rotatably mounted on the vehicle and having a magnet located at its centre, the second coil being attached to an amplifier and warning device. On fall of tire pressure the switch closes the first coil so that in passing close to the magnet a current flows in the coil creating a magnetic flux. This flux associated with the first coil induces a signal in the second coil which after amplification actuates the warning device.

5 Claims, 2 Drawing Figures

TIRE DEFLATION DETECTION

This invention relates to the detection of the whole or partial deflation of a pneumatic tire during running and in particular to the detection of the reduction of inflation pressure below a predetermined value. This is particularly important in the case of a tire which does not unduly affect the handling characteristics of a vehicle on deflation.

In accordance with the invention an apparatus for detecting the reduction of inflation pressure of a pneumatic tire mounted on a wheel on a vehicle below a predetermined value comprises a magnet non-rotatably mounted on the vehicle near the wheel, a pressure responsive device, a first electric circuit mounted on the wheel to rotate therewith, the magnetic flux associated with said first circuit being created or changed by actuation of said pressure responsive device when the inflation pressure falls below the predetermined value and when the first circuit moves adjacent said magnet, a second electric circuit non-rotatably mounted on the vehicle in which a signal may be induced by said flux when the first circuit moves adjacent said second circuit, and an indicating device in said second circuit actuable by said signal.

In accordance with the invention also a method of detecting the reduction of inflation pressure of a pneumatic tyre mounted on a wheel on a vehicle below a predetermined value comprises creating or changing a magnetic flux associated with a first electric circuit located on the wheel on which the tire is mounted by actuation of a pressure responsive device when the inflation pressure of the tire falls below the predetermined value and when the circuit moves during rotation of the wheel into close proximity with a magnet non-rotatably mounted near to the wheel thus causing said flux to induce an electric signal in a second electric circuit non-rotatably mounted on the vehicle, said second circuit containing an indicating device which is actuated by said signal.

The magnetic flux may be created or changed by the actuation e.g. closing, of a switch in the first electric circuit e.g. a coil, mounted on the inside of the wheel rim. This flux then induces a signal in the second circuit which is fixed in relation to the vehicle on which the tire and wheel is mounted e.g. on the body or chassis. The magnet may be fixed on the vehicle chassis or body so as not to rotate with the wheel. The signal induced in the second circuit may be amplified, the amplified signal then actuating the indicating device e.g. a buzzer, bell or warning light.

In a preferred construction the second circuit comprises a coil non-rotatably mounted on the vehicle close to the wheel, the magnet being positioned in close proximity to the coil, the relative positions of the first circuit, the coil and the magnet being such that once during each rotation of the wheel the magnet is in a position whereby it induces substantially the maximum current in the first circuit depending on the rotational velocity of the wheel simultaneously with the magnetic flux created in the first circuit by the said substantially maximum current inducing substantially the maximum signal in the coil for the same rotational velocity of the wheel. Preferably the first circuit comprises only one coil mounted on the wheel the relative positions of the coils of the first and second circuits and the magnet being such that once during each rotation of the wheel the magnet is in a position whereby it induces substantially the maximum current in the coil of the first circuit depending on the rotational velocity of the wheel simultaneously with the magnetic flux created in the coil of the first circuit by the said substantially maximum current inducing substantially the maximum signal in the coil of the second circuit for the same rotational velocity of the wheel. The magnet may be positioned within and on the axis of the coil of the second circuit and the relative positions of the coils are such that once during each rotation of the wheel the two coils are in coaxial alignment.

Figure 2:
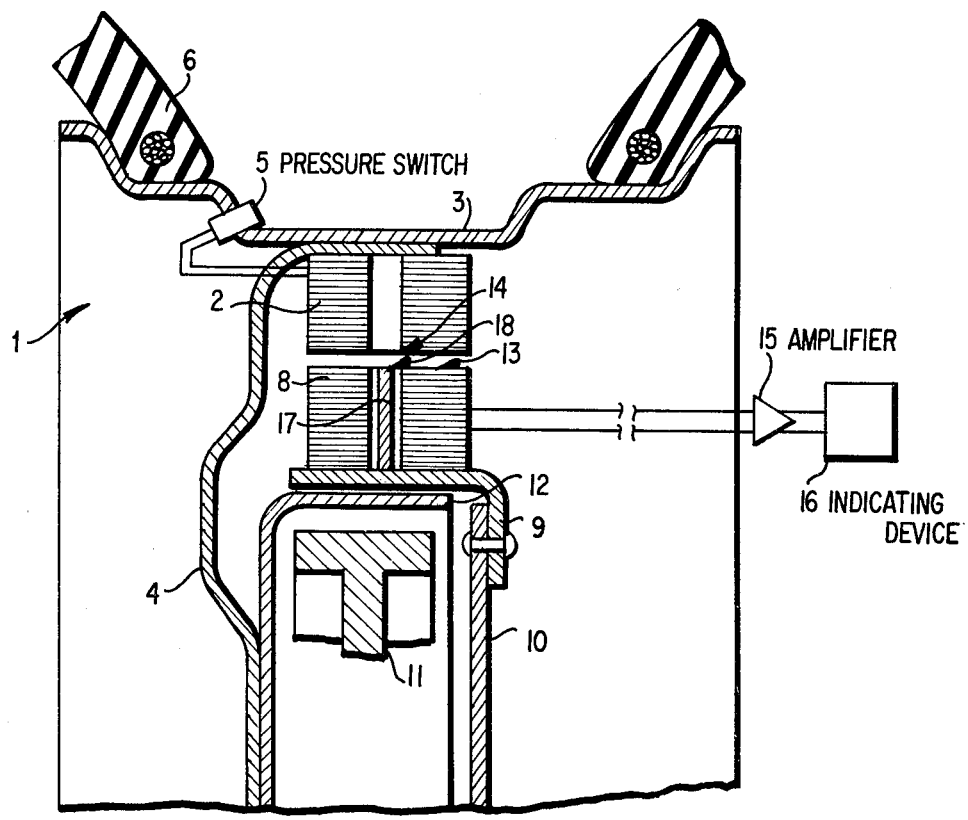

Two embodiments of the invention will now be described by way of example only and is illustrated in the accompanying diagrammatic drawing in which FIG. 1 is a fragmentary cross-section through a wheel and brake members of a first embodiment of the invention and FIG. 2 is a fragmentary cross-section through a wheel and brake members of a second embodiment of the invention.

A first circuit 1 comprising a first coil 2 is mounted radially inwards of a wheel rim 3 with its axis parallel to the axis of the wheel 4. The first coil has 1200 turns of 36 S.W.G. insulated copper wire and its resistance is 25 ohms. Its dimensions are 1 inch overall diameter on a 9/32 inch diameter core, and a length of one-fourth inch. It should be noted however, that for copper winding wire the ratio of turns/unit cross sectional area to resistance/unit length varies little over the gauge range 24–42 so that the wire gauge used is not critical. The ends of the first coil are electrically connected to a conventional pressure switch 5 which comprises two contacts urged together by a spring but kept apart by the inflation pressure of tire 6 acting on a diaphragm. The pressure switch is mounted on the wheel rim so as to be actuated when the inflation pressure of the tire falls below a predetermined value.

The first coil 2 rotates with the wheel and to prevent unbalance of the wheel a balance weight (not shown) may be fixed on the wheel diametrically opposite to the first coil if required.

A second circuit 7 comprising a second coil 8 is fixed to a convenient non-rotating member of the vehicle e.g. the chassis body or brake caliper or brake backplate. In the diagram the second coil is shown mounted on a bracket 9 itself mounted on the brake backplate 10, to which brake shoes 11 for engagement with a brake drum 12 on the wheel 4 are secured. The position of the second coil 8 is such that at one position during each rotation its axis is in alignment with that of the first coil 2. In this coaxial arrangement an end face 13 of the second coil 8 is arranged so as to be parallel to and close to an end face 14 of the first coil 2 at the said one position of the wheel during each rotation. The second coil 8 has, for example, an external diameter of 1 inch and an internal diameter (i.e. former diameter) of three-eighth inch. The length of the former is 1 inch and that of the second coil seven-eighth inch, the coil containing approximately 12,000 turns of 42 gauge copper wire. This second coil will produce 1 volt output with a one-tenth inch gap between the first and second coils.

The second circuit 7 is closed and includes an amplifier 15 and an indicating device 16 e.g. a bell, a buzzer, or a light positioned near the driver.

A short cylindrical permanent magnet 17 is disposed coaxially within the second coil 8. An end face 18 of the magnet is preferably coplanar with the end face 13 of the second coil 8. The magnet used with the second coil described above is 1 inch long and one-fourth inch diameter.

During normal running of the vehicle with the tire in the inflated state the pressure switch 5 and therefore the first circuit 1 is open and the permanent magnet 17 does not induce any current in the first coil 2 when the coil is moved into close proximity with the magnet as shown in the diagram. However, on actuation of the pressure switch 5 on deflation of the tire 6, the first circuit is closed so that when the wheel 4 rotates to the position whereby the first coil 2 comes into alignment with the second coil 8 a current is induced in the first coil because of its movement relative to the permanent magnet. The flux set up by the current in the first coil 2 then induces a current in a second coil 8 which on amplification by the amplifier 15 produces a signal which actuates the indicating device 16.

The signal i.e. voltage, induced in the second coil depends on the number of turns in the second coil, its proximity with the first coil, its impedance considered relative to that of the amplifier input, the distance between the magnet and the first coil, and the magnet remenance. These variables should be optimised for individual systems.

In the example given above the first and second coil have axes parallel with the rotational axis of the wheel. If desired the coils may be arranged with their axes extending radially of the wheel as shown in FIG. 2.

Similarly, if desired, the pressure switch mounted on the wheel may be constructed to operate in the opposite manner i.e. to open the first circuit when the pressure in the tire falls. In this case the device would produce a signal from each wheel until the pressure fell in one tire when the signal from its wheel would disappear, thereby giving a warning to the driver of tire deflation.

Having now described our invention what we claim is:

1. Apparatus for detecting the reduction of inflation pressure of a pneumatic tire mounted on a wheel on a vehicle, said apparatus comprising:

a first circuit mounted on the wheel to rotate therewith, the first circuit comprising a first coil and a pressure responsive switch electrically connected thereto, the switch having an open and a closed position and being changeable from one of the positions to the other on decrease of inflation pressure below a predetermined value, a second circuit non-rotatably mounted on the vehicle, said second circuit comprising a second coil and an indicating device electrically connected thereto, and a bar magnet located coaxially within the second coil, the first and second coils being disposed on the wheel and vehicle respectively, whereby once during each revolution of the wheel they are coaxially juxtaposed with the first coil moving in a direction substantially perpendicular to the axis of the second coil and the bar magnet and, if the pressure switch is closed, a first electric signal is induced in the first coil due to movement of the first coil adjacent the magnet and a second signal is induced in the second coil due to its juxtaposition with the first coil and said second signal actuates the indicating device, the change of the pressure responsive switch from one position to the other changes the signal fed to the indicating device to warn the vehicle driver of the decrease in inflation pressure of the tire.

2. Apparatus according to claim 1 wherein the second circuit includes an amplifier electrically connected to the second coil and to the indicating device, the amplifier amplifying the signal induced in the second coil which is then fed to the indicating device.

3. Apparatus according to claim 1 wherein the coils are arranged with their axes substantially parallel to the rotational axis of the wheel.

4. Apparatus according to claim 1 wherein the coils are arranged with their axes substantially radially of the wheel.

5. Apparatus according to claim 1 wherein the pressure responsive switch is closeable on decrease of inflation pressure below the predetermined value.

* * * * *